Figure 1:
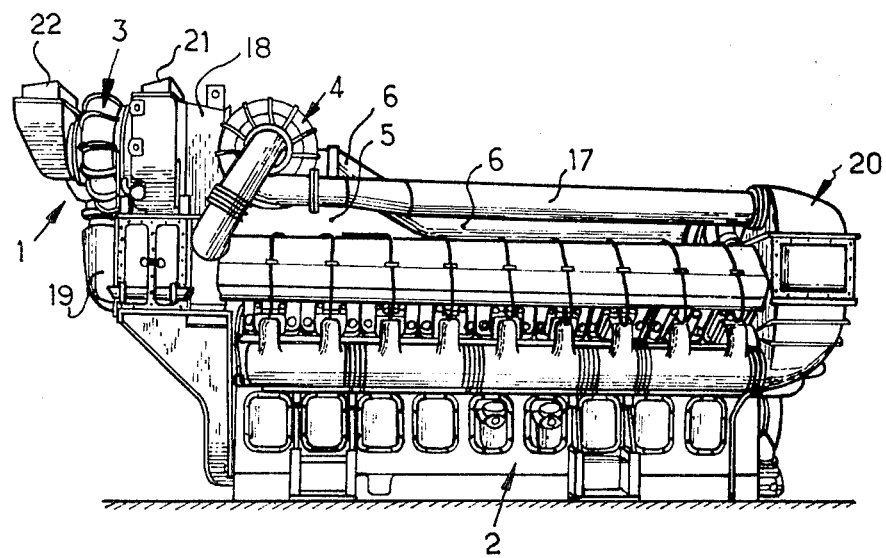

United States Patent [19]

Froeliger

[11] 4,196,593
[45] Apr. 8, 1980

[54] INTERNAL COMBUSTION ENGINE SUPERCHARGER SET

[75] Inventor: Jacques E. M. Froeliger, Le Blanc-Mesnil, France

[73] Assignee: Societe d'Etudes de Machines Thermiques S.E.M.T., Saint Denis, France

[21] Appl. No.: 852,064

[22] Filed: Nov. 16, 1977

[30] Foreign Application Priority Data

Dec. 1, 1976 [FR] France .................. 76 36223

[51] Int. Cl.² ............................................ F02B 37/00
[52] U.S. Cl. ........................................ 60/612; 417/409
[58] Field of Search ................ 60/612; 417/407, 409

[56] References Cited
U.S. PATENT DOCUMENTS 4,032,262  6/1977  Zehnder ..................... 60/612 X

FOREIGN PATENT DOCUMENTS 1397178  3/1965  France ........................................ 60/612

OTHER PUBLICATIONS

"Achieving Constant Horsepower by Turbocharging", Kellett et al., *Engine Design and Applications*, Nov. 1965, pp. 4 to 11.

*Primary Examiner*—Michael Koczo
*Attorney, Agent, or Firm*—Kenyon & Kenyon

[57] ABSTRACT

A supercharger set for internal combustion engines comprising two turboblowers the two axes of which being mutually perpendicular. The high-pressure turbine is mechanically coupled to the high-pressure compressor, whereas the low-pressure turbine is mechanically coupled to the low-pressure compressor. A single casing is used for the egress of the gases from the high-pressure turbine and their ingress into the low-pressure turbine.

5 Claims, 2 Drawing Figures

INTERNAL COMBUSTION ENGINE SUPERCHARGER SET

The present invention relates generally to a supercharger set for internal combustion engines and is more particularly intended to so design such a set as to reduce its overall dimensions to a minimum.

Nowadays supercharger sets are auxiliary devices in current use with, in particular, Diesel engines. A conventional supercharger set is made up of, for example, a compressor comprising two stages mounted in series, namely a low-pressure compressor in series with a high-pressure compressor, and driven by the engine exhaust gases through the medium of a low-pressure and a high-pressure turbine, respectively.

According to a first type of known arrangement, the axis of the low-pressure and high-pressure compressors are parallel with one another, but this is not an ideal solution as far as the space saving problem is concerned. In order to reduce the space occupied by the supercharger set, another type of arrangement has been proposed according to which the axis of the turbocompressors are mutually perpendicular, with a common axis for the low-pressure compressor (first stage) and the high-pressure turbine (first stage) and a common axis for the high-pressure compressor (second stage) and the low-pressure turbine (second stage).

In order to additionally reduce the overall dimensions of the supercharger set, attempts have been made to reduce the space occupied by the casings, notably by using a single casing for the egress of the high-pressure turbine gases and the ingress of the low-pressure turbine gases. This solution, however, has been applied only to parallel-or coinciding-axis exhaust-gas turbocompressors. It offers notably the advantage of making unnecessary the use of an expansion bellows or the like between the high- pressure turbine and the low-pressure turbine.

An arrangement is also known wherein instead of the axis of the low-pressure compressor (first stage) being common with that of the high-pressure turbine (first stage), it is common with the axis of the low-pressure turbine (second stage) and therefore the axis of the high-pressure compressor (second stage) is common with that of the high-pressure turbine (first stage).

With these various arrangements in view, the invention allows the dimensions of a supercharger set comprising two stages with mutually perpendicular axes to be reduced to a minimum by combining the foregoing arrangement with the use of a single casing for the exit of the high-pressure turbine gases and the ingress of the low-pressure turbine gases.

The invention therefore has for its object a supercharger set for internal combustion engines, comprising two stages, each consisting of an exhaust-gas turbocompressor, the axes of the two turbocompressors being mutually perpendicular, the said supercharger set being characterized by the arrangement of the high-pressure turbine, the inlet of which is directly connected to the exhaust manifold and which is mechanically coupled to the high-pressure compressor whereas the low-pressure turbine whose inlet is connected in series to the outlet of the high-pressure turbine is mechanically coupled to the low-pressure compressor whose delivery port is connected in series to the suction port of the high-pressure compressor, which arrangement is combined with the use of a single casing for the exit of the high-pressure turbine gases and the entry of the low-pressure turbine gases.

Figure 2:
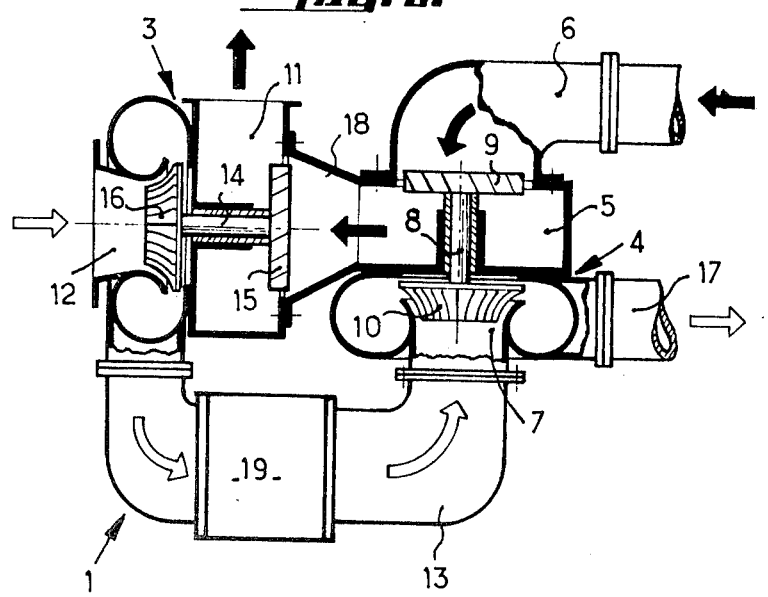

Other advantages, features and details of the invention will appear more clearly from the following explanatory description made with reference to the appended drawings given solely by way of example and wherein:

FIG. 1 is a perspective view of a Diesel engine equipped with a supercharger set according to the invention, and, FIG. 2 is a diagrammatic partial sectional top view showing in more detail the design of a supercharger set of the Diesel engine of FIG 1.

Referring to the appended Figures, it is seen that a supercharger set 1 for an internal combustion engine 2 is made up of two stages, each consisting of two exhaust-gas turbocompressors or turboblowers 3 and 4 mounted in series. According to the invention the high-pressure turbine 5 (first stage) the intake of which is directly connected to the exhaust manifold 6 is mechanically coupled to the high-pressure compressor 7 (second stage). In other words the shaft 8 of the rotor 9 of the turbine 5 is common with the shaft driving the rotor 10 of the compressor 7. The low-pressure (second stage) turbine 11 has its inlet connected in series to the outlet of the high-pressure turbine 5 and is mechanically coupled to the low-pressure compressor 12 (first stage), the discharge port of which is connected in series to the suction port of the high-pressure compressor 7 through a connecting pipe 13. Otherwise stated, the shaft 14 of the rotor 15 of the turbine 11 is common with the shaft supporting the rotor 16 of the low-pressure compressor 12. The outlet of the low-pressure turbine 11 is open to the atmosphere, the inlet of the low-pressure compressor 12 communicates with the atmosphere, whereas the outlet of the high-pressure compressor 7 is directly connected to the intake manifold 17. According to the invention, the axes of the shafts 8 and 14 of the two turboblowers are mutually perpendicular.

Another feature of the invention, which is to be considered in combination with the arrangement just described, lies in the fact that a single casing 18 is provided for the exit of the gases from the high-pressure turbine 5 and the intake of the gases into the low-pressure turbine 11. Also to be noted is the provision, in the connecting pipe between the low-pressure compressor 12 and the high-pressure compressor 7, or the first cooling system 19 of the air previously compressed in the first stage of the supercharger set. Also provided is a second cooling device 20 which is mounted at the intake manifold 17 after the compression of the air by the second stage and before its entry into the engine cylinders.

As seen in FIG. 1, the supercharger set 11 according to the invention is mounted towards one end of the engine and only the second or final cooling system 20 is mounted at the other end of the engine.

The operation of such a supercharger set is as follows. The exhaust gases proceeding from the exhaust manifold 6 drive the rotor 9 of the high pressure-turbine 5, which, through the medium of the shaft 8 supporting it, drives the rotor 10 of the high-pressure compressor 7. The exhaust gases emerging from the high-pressure turbine 5, drive the rotor 15 of the low-pressure turbine 11 which in turn drives through its shaft 14 the rotor 16 of the low-pressure compressor 12. The exhaust gases issuing from the low-pressure turbine 11 pass out into the atmosphere through an outlet port 21. Simultaneously, owing to the rotor 16 of the low-pressure compressor 12 being driven by the low-pressure turbine 11, some air is sucked through the intake port 22, is compressed and is directed through the connecting pipe 13 to the high-pressure compressor 7. The latter, which is already driven by the high-pressure turbine 5, again compresses the sucked gases which then go directly into the intake manifold 7 and then into the engine cylinders after a final cooling in the cooling stage 20.

While the operation of such a supercharger set is known in itself, the originality of the device lies in the fact that it allows a minimum size of the set to be obtained by mounting the turbocompressors along two mutually perpendicular axes, with the axis of the high-pressure turbine being common with that of the high-pressure compressor, the axis of the low-pressure turbine being common with that of the low-pressure compressor, and a single casing being provided for the exit of the gases from the high-pressure turbine and their ingress into the low-pressure turbine. This is a novel combination, for it solves a particular problem, which, up to the present, had been solved only partially.

It should be noted that in the above-described supercharger set comprising two stages with mutually perpendicular axes, the solution adopted is that of a common axis for the high-pressure compressor and the high-pressure turbine rather than a common axis for the high-pressure compressor and the low-pressure turbine. This choice is due to the fact that, since the high-pressure compressor requires the highest power, it is advantageous to couple it to the high-pressure turbine and therefore couple the low-pressure compressor to the low-pressure turbine.

Of course, the invention is by no means limited to the form of embodiment described and illustrated by way of example only, but comprises all the technical equivalents of the means described if the latter are carried out and used within the scope of the following claims.

What is claimed is:

1. In a two-stage exhaust-gas driven supercharger set for an internal combustion engine having an inlet manifold and an exhaust manifold, the supercharger set including a high-pressure turbocompressor having a high-pressure turbine mounted on a common first shaft with a high-pressure compressor, and a low-pressure turbocompressor having a low-pressure turbine mounted on a common second shaft with a low-pressure compressor, the axes of the first and second shafts being mutually perpendicular, the inlet of the high-pressure turbine being connected to the exhaust manifold, the outlet of the high-pressure turbine being connected to the inlet of the low-pressure turbine, the outlet of the low-pressure compressor being connected in series with the inlet of the high-pressure compressor, and the outlet of the high-pressure compressor being connected in series with the inlet manifold, the improved arrangement comprising:

a single casing directly connecting the outlet of the high-pressure turbine to the inlet of the low-pressure turbine and wherein the single casing feeds exhaust gases from a circumferential outlet of the high-pressure turbine in a straight line directly into an axial inlet of the low-pressure turbine.

2. A supercharger set according to claim 1 further comprising an intermediate cooler mounted in series between the low-pressure compressor and the high-pressure compressor and a final cooler mounted in the intake manifold downstream of the high-pressure compressor.

3. A supercharger set according to claim 1 wherein the turbine inlet and the compressor inlet of both the high-pressure and the low-pressure turbocompressors are coaxial with the respective first and second shafts.

4. A supercharger set according to claim 3 wherein both the high-pressure and the low-pressure turbocompressors comprise an axial flow turbine and a centrifugal compressor.

5. A supercharger set according to claim 3 wherein the inlet to the low-pressure compressor faces in the opposite direction to the outlet of the high-pressure compressor, and the outlet of the low-pressure compressor faces in the same direction as the inlet to the high-pressure compressor.